July 18, 1950      S. D. STOOKEY      2,515,941

PHOTOSENSITIVE OPAL GLASS

Filed Sept. 9, 1946

INVENTOR.
STANLEY DONALD STOOKEY
BY
F. H. Knight
ATTORNEY

Patented July 18, 1950

2,515,941

UNITED STATES PATENT OFFICE 2,515,941

PHOTOSENSITIVE OPAL GLASS

Stanley Donald Stookey, Corning, N. Y., assignor to Corning Glass Works, Corning, N. Y., a corporation of New York Application September 9, 1946, Serial No. 695,802

13 Claims. (Cl. 49—92)

This invention relates to photosensitive glasses, that is, glasses in which exposure to short wave radiations, 400 millimicrons or less, brings about an invisible change as a result of which irradiated areas are capable of heat developed coloration while non-irradiated areas remain substantially unchanged on heating.

In pending applications Serial Nos. 513,441, 513,443 and 513,444, filed December 8, 1943, there are described colorless photosensitive glasses in which a colored photographic image may be formed by exposure through a suitable negative followed by heating the glass. In such glasses the contrast between high lights and low lights is a variation in the density of the color of the light-affected areas of the glass.

In my pending application Serial No. 513,445 filed December 8, 1943, I have described colorless photosensitive glasses in which a colored photographic image likewise may be formed and developed by suitable exposure through a negative and subsequent heating but which become opacified throughout during heating to provide a white opaque background for the colored image.

The primary object of this invention is to provide photosensitive glasses in which only the developed image is opaque or glasses in which light-affected areas become opacified on heating while unexposed areas with the same heat treatment remain clear and unchanged.

Another object is to provide colorless photosensitive glasses in which the developed image is both opaque and colored while unexposed areas remain clear and unchanged during heating.

I have discovered new photosensitive glass compositions in which selective irradiation and subsequent heating produce in the glass an opaque image by the differential precipitation of either lithium disilicate or barium disilicate in the irradiated areas during heating. To cause such selective precipitation of the opacifying disilicate particles it is necessary to incorporate into the glass one of the photosensitizing metals, gold, silver or copper, employed in the glasses of the above mentioned patent applications. These make the glass sensitive to short wave radiations and on subsequent heating of the glass they provide colloidal nuclei for the formation and growth of the opacifying crystallites. In another application Serial No. 695,801 filed by me concurrently herewith I have described and claimed photosensitive glasses and articles in which the image forming crystallites are lithium disilicate. The present application is specifically directed to glasses and articles in which photographic images are formed by the differential precipitation of barium disilicate.

The glasses of the present invention contain 50% to 65% $SiO_2$, 5% to 15% $Na_2O$ and 15% to 45% $BaO$, and a small amount of gold as a sensitizing agent. Silver and copper are not effective. $K_2O$ may be substituted wholly or in part for $Na_2O$. Addition of $Al_2O_3$, $B_2O_3$ or oxides of the second periodic group other than $BaO$ generally tends to prevent opacification or precipitation of barium disilicate during heating of the glass. However, small percentages of one or more of these oxides may be employed to control excessive opacification and to extend the working range of the glass. Up to 4% $Al_2O_3$, or up to 3% of $B_2O_3$ or $CaO$ or $MgO$ or $ZnO$, or up to 12% $SrO$ may thus be employed.

The new glasses are transparent and uncolored by the gold when fabricated, but when exposed to short wave radiations and subsequently heated, the exposed areas become opacified by the precipitation of barium disilicate but unexposed areas remain clear. The minimum amount of gold which is effective to induce opacification of the exposed areas is about .004% Au. The opacification of the exposed areas is progressively intensified by increasing the amount of gold. Maximum opacification is produced by about .05% Au. Maximum opacification is also produced by larger amounts, but their use is impractical for economic reasons. The exposed and opacified areas may be colored by the gold if a sufficient amount within or above the above recited range is used and if the irradiation and subsequent heat treatment of the glass are sufficiently intense or prolonged, as will later appear. The colors obtained may vary from blue through lavender and pink to red. Under conditions which produce coloration, the opacification of the irradiated areas of the glass occurs subsequent to their coloration. The gold is preferably introduced into the batch as a solution of gold in acid to form gold chloride.

In general, the use of gold as a sensitizing metal in the new glasses is subject to the same considerations and limitations which attend its use in the glasses disclosed in my pending application Serial No. 513,443 referred to above. Photosensitivity of the new glasses is prevented by the presence of reducing agents and is prevented or objectionably diminished by the presence of substantial amounts of compounds of arsenic, lead, thallium, vanadium, uranium, iron, manganese or selenium.

Cerium in small amounts intensifies the photosensitivity of the new glasses, that is, it increases the effect of a given exposure or shortens the time of exposure necessary to produce a given effect. In large amounts it decreases or prevents the photosensitivity of the glass. The maximum intensifying effect of cerium occurs in glasses containing about .04% $CeO_2$ and not more than .05% $CeO_2$ should be employed.

The addition of up to .03% $SnO_2$ or $Sb_2O_3$ tends to prevent a blue and to permit only a red coloration to develop in the surface of the irradiated area of the glass during heating. The development of opacity in the same area subsequently occurs only below the surface where the glass has not become red. This results in a transparent red image superimposed on a white opaque image. The density of the coloration in the presence of $SnO_2$ or $Sb_2O_3$ increases with increasing gold content and the depth to which the coloration extends or penetrates into the glass increases with increasing time of exposure of the glass to short wave radiations.

Coloration of the irradiated areas of the glass by the gold during heating may be prevented by using an amount of gold too small to produce coloration, though sufficient to produce opacification, or by employing larger amounts of gold and using an exposure time or intensity sufficient to bring about opacification but insufficient to permit a visible coloration to develop on heating. Such exposure conditions vary for different compositions but may readily be determined by trial. The temperature for the development of opacification is somewhat higher in a given glass than for the development of the color of the gold and is about 100° C. or less below the softening point of the glass. Coloration without opacification may therefore be produced by using temperatures high enough to cause coloration of the exposed areas but not high enough to cause opacification thereof.

From the foregoing description it will be seen that various effects can be produced by means of the invention. Such effects include white opacified images or designs, colored opacified images or designs, and a colored but unopacified image or design in the surface of the glass superimposed on an identical opacified image or design within the body of the glass, any one or all of which can be produced in a single glass article.

The accompanying drawing illustrates articles made in accordance with the invention.

Fig. 1 is a plan view of a glass panel 10 in which light-diffusing or opacifying microscopic crystallites of barium disilicate are precipitated in the glass to form a white opaque design comprising block letters 11, 12 and 13, the glass being otherwise clear and colorless.

Figure 1:
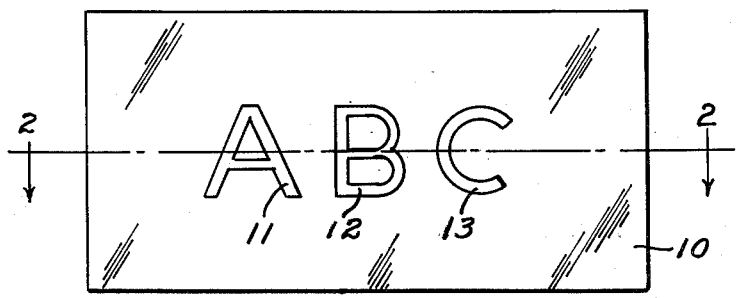
Figure 2:
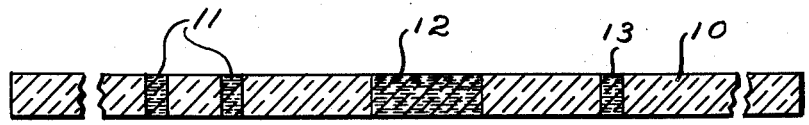
Fig. 2 is a sectional view on an enlarged scale on line 2—2 of Fig. 1 showing that the opacifying crystallites forming the design are present throughout the thickness of the glass so that the design is three-dimensional and extends completely through the glass panel.
Figure 3:
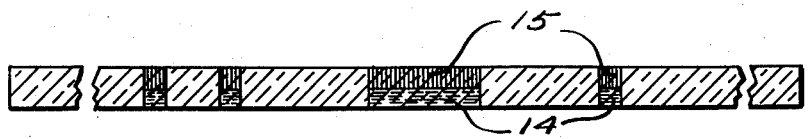
Fig. 3 is an enlarged sectional view of a glass panel similar to that shown in Fig. 2 and containing a design comprising block letters as in Fig. 2 which are opaque white in the section designated 14 at the back of the panel, and are a transparent red color in the section designated 15 at the front of the panel.

The following batches in parts by weight are given as examples to illustrate but not to limit my invention:

|  | 1 | 2 | 3 | 4 | 5 | 6 |
|---|---|---|---|---|---|---|
| $SiO_2$ | 100 | 100 | 100 | 100 | 100 | 100 |
| $Na_2CO_3$ | 14.3 | 14.3 | 14.3 | 40.7 | 25.7 | 22 |
| $NaNO_3$ | 4.7 | 4.7 | 4.7 | 5.6 | 4.7 | 4 |
| $K_2CO_3$ | 17.7 | 17.7 | 17.7 |  |  |  |
| $BaCO_3$ | 55.5 | 55.5 | 55.5 | 86.4 | 42.7 | 36.6 |
| $Al(OH)_3$ | 5.0 | 5.0 | 5.0 |  |  |  |
| $CeO_2$ | .06 |  |  | .07 | .06 | .05 |
| $Sb_2O_3$ | .02 |  |  |  |  |  |
| Au | .013 | .013 | .013 | .024 | .013 | .006 |
| $SnO_2$ |  | .02 |  |  |  |  |
| SrO |  |  |  |  | 23.7 |  |

When the above batches are melted and fabricated in the usual manner, they produce substantially transparent glasses which, when exposed to short wave radiations and subsequently reheated, will become opacified in the exposed areas but will remain unchanged in the unexposed areas. Composition 1 is particularly suitable for my purpose and when melted it results in a glass which consists approximately of 60% $SiO_2$, 6% $Na_2O$, 6% $K_2O$, 26% BaO, 2% $Al_2O_3$, .04% $CeO_2$, .02% $Sb_2O_3$, and .0075% Au.

The proper time of exposure and subsequent heat treatment of the new glasses will depend upon the gold content, the character and intensity of the light source and the color effects desired. In general when plates of glass made from the above compositions are exposed from 1 to 10 minutes, either directly or through a suitable photographic negative, at a distance of 14 inches from a 60 ampere carbon arc using "C" carbon electrodes (manufactured by The National Carbon Company), and are subsequently heated for 10 minutes to an hour or more at 600° to 700° C., an opacification will be developed in the irradiated area of the glass while the unexposed portion will remain clear. If the exposure is made through a photographic negative, the opacification will form a positive image in minute detail in the glass. More specifically for example, composition 1 will develop a white opal with a two minute exposure followed by heating for a few minutes at 700° C. With a five minute exposure the color is blue; with a 20 minute exposure the color is lavender and with a 40 minute exposure the color is pink. The penetration of the color and the opacity into the glass increase with the time of exposure. Composition 5 will develop a translucent opal which is faintly blue when exposed for ten minutes and heated at 700° C. With an exposure of one hour followed by heating for a few minutes at 700° C., a strong opacification is developed which is colored blue. In each case the unexposed portion of the glass remains clear and unchanged in color during heating.

The effect of the irradiation and the image produced by heating the irradiated glass extend from the surface into the glass usually to a depth of 1 to 5 mm. or more, depending upon the time and intensity of exposure and the gold content and being greater as the exposure or the gold content is increased.

X-ray diffraction patterns of the new glasses after irradiation and heat treatment show that crystals of barium disilicate are present in the opacified areas but are not present in the clear or unopacified areas. Such crystals are microscopic in size and are precipitated during the heat treatment.

Ultraviolet emitting lamps, such as the carbon arc or the quartz mercury arc, are convenient sources of radiations which are effective for my purpose, but treatment with X-rays, radioactive radiations and other sources of radiations shorter than 400 millimicrons is included within the scope of the present invention.

The new glasses are useful for many purposes such as: illuminating ware of various kinds, signalling devices, headlights, windows, etc., in which transverse, opaque or translucent ribbons within the otherwise clear glass are employed as louvres to transmit direct light in some directions but to cut off or transmit only diffused light in others; illuminated decorative photographs, block-letter signs, etc., wherein three-dimensional light-scattering images are employed to produce unique effects with oblique illumination; photographic opal designs in glass tableware; durable, permanent images for projection, as in lantern slides. In making such articles the desired designs, transverse louvres, images, etc., are produced in the glass by irradiation thereof through appropriate photographic negatives followed by uniformly heating the glass throughout as set forth above.

The term "silicate glass," as used in the claims, means a glass prepared by fusion of raw glass-making materials under non-reducing conditions containing, on the oxide basis, a major proportion of silica and a minor proportion of an alkali metal oxide such as sodium oxide or potassium oxide and a minor proportion of barium oxide, and optionally containing a minor proportion of one or more other conventional glass-forming oxides such as $Al_2O_3$, $B_2O_3$ or an oxide of a metal of the second periodic group other than barium, but being free of constituents which inhibit photosensitivity including compounds of arsenic, lead, thallium, vanadium, uranium, iron, manganese, and selenium and also over 4% $Al_2O_3$, over 3% $B_2O_3$ or CaO or MgO or ZnO, and over 12% SrO.

I claim:

1. A photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, 0.004% to 0.05% of gold computed as Au, and up to 0.05% $CeO_2$.

2. A photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, 0.004% to 0.05% of gold computed as Au, and up to 0.03% $SnO_2$.

3. A photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, 0.004% to 0.05% of gold computed as Au, and up to 0.03% $Sb_2O_3$.

4. A photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, 0.004% to 0.05% of gold computed as Au, up to 0.05% $CeO_2$, and up to 0.03% $Sb_2O_3$.

5. An article comprising a body of irradiated substantially colorless photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, and 0.004% to 0.05% of gold computed as Au, said glass body containing within its mass a predetermined latent photographic image capable of being developed, by uniform heating of the entire glass body, into a visible opacified image exhibiting photographic detail and comprising light-diffusing crystallites of barium disilicate.

6. An article comprising a body of irradiated, substantially colorless photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, 0.004% to 0.05% of gold computed as Au, and up to 0.05% $CeO_2$, said glass body containing within its mass a predetermined latent photographic image capable of being developed, by uniform heating of the entire glass body, into a visible, opacified image exhibiting photographic detail and comprising light-diffusing crystallites of barium disilicate.

7. An article comprising a body made of a photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, and 0.004% to 0.05% of gold computed as Au, selected portions of said glass body containing light-diffusing crystallites of barium disilicate in quantity and arrangement to form within its mass a heat-stable, opaque image exhibiting photographic detail.

8. An article comprising a body made of a photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, 0.004% to 0.05% of gold computed as Au, and up to 0.05% $CeO_2$, selected portions of said glass body containing light-diffusing crystallites of barium disilicate in quantity and arrangement to form within its mass a heat-stable, opaque image exhibiting photographic detail.

9. An article comprising a body made of a photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, 0.004% to 0.05% of gold computed as Au, and up to 0.03% $SnO_2$, selected portions of said glass body containing light-diffusing crystallites of barium disilicate in quantity and arrangement to form within its mass a heat-stable, opaque image exhibiting photographic detail.

10. An article comprising a body made of a photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, 0.04% to 0.05% of gold computed as Au, and up to 0.03% $Sb_2O_3$, selected portions of said glass body containing light-diffusing crystallites of barium disilicate in quantity and arrangement to form within its mass a heat-stable, opaque image exhibiting photographic detail.

11. An article comprising a body made of a photosensitive glass consisting essentially of a silicate glass containing, on the oxide basis by weight, 50% to 65% $SiO_2$, 5% to 15% of an alkali metal oxide selected from the group consisting of $Na_2O$, $K_2O$, and mixtures of $Na_2O$ and $K_2O$, 15% to 45% BaO, 0.004% to 0.05% of gold computed as Au, up to 0.03% $Sb_2O_3$ and up to 0.05% $CeO_2$, selected portions of said glass body containing light-diffusing crystallites of barium disilicate in quantity and arrangement to form within its mass a heat-stable, opaque image exhibiting photographic detail.

12. An article comprising a body made of a photosensitive glass consisting essentially of a silicate glass containing, on the oxide basis by weight, 50% to 65% SiO$_2$, 5% to 15% of an alkali metal oxide selected from the group consisting of Na$_2$O, K$_2$O, and mixtures of Na$_2$O and K$_2$O, 15% to 45% BaO, and 0.004% to 0.05% of gold computed as Au, selected portions of said glass body containing light-diffusing crystallites of barium disilicate in quantity and arrangement to form within its mass a heat-stable, opaque image exhibiting photographic detail, and superimposed on said opaque image and in register therewith a colored, unopacified image.

13. The method of making a glass article which comprises forming an article of a photosensitive glass consisting essentially of a silicate glass containing, on the oxide basis by weight, 50% to 65% SiO$_2$, 5% to 15% of an alkali metal oxide selected from the group consisting of Na$_2$O, K$_2$O, and mixtures of Na$_2$O and K$_2$O, 15% to 45% BaO, and 0.004% to 0.05% of gold computed as Au, exposing an area of the article to short-wave radiations, and thereafter heating the article uniformly for a time and at a temperature sufficient to cause precipitation of barium disilicate crystallites in the exposed area.

STANLEY DONALD STOOKEY.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,144,943 | Sharp et al. | Jan. 24, 1939 |
| 2,237,042 | Truby | Apr. 1, 1941 |
| 2,292,684 | Blau | Aug. 11, 1942 |
| 2,326,012 | Dalton | Aug. 3, 1943 |
| 2,422,472 | Dalton | June 17, 1947 |

Certificate of Correction

Patent No. 2,515,941                                           July 18, 1950

STANLEY DONALD STOOKEY

It is hereby certified that error appears in the printed specification of the above numbered patent requiring correction as follows:

Column 6, line 54, for "0.04%" read *0.004%*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*